Figure 1:
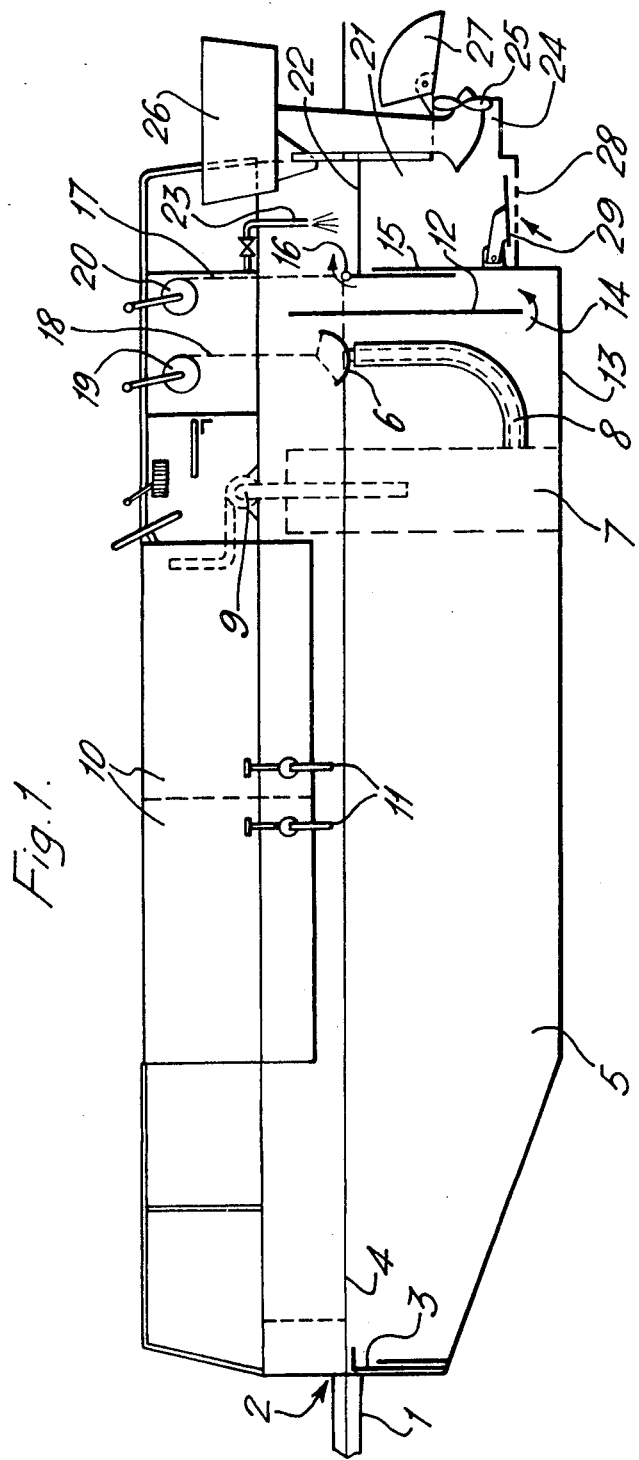

United States Patent [19]

Brydoy et al.

[11] 3,737,040
[45] June 5, 1973

[54] VESSEL FOR THE REMOVAL OF OIL ON WATER

[76] Inventors: Sverre Brydøy, Spireaveien 6, 3150 Tolvsrod; Aage Sletsjøe, Joh. Wessmanns vei 7b, 3155 Asgardstrand, both of Norway

[22] Filed: Apr. 27, 1971

[21] Appl. No.: 137,888

[30] Foreign Application Priority Data

May 4, 1970 Norway..................................1677/70

[52] U.S. Cl..............210/206, 210/DIG. 21, 210/242
[51] Int. Cl...........................C02b 9/02, E02b 15/04
[58] Field of Search........................210/242, DIG. 21, 210/205-208

[56] References Cited

UNITED STATES PATENTS

| | | | |
|---|---|---|---|
| 1,591,024 | 7/1926 | Dodge | 210/242 |
| 3,615,017 | 10/1971 | Valdespino | 210/DIG. 21 |
| 3,219,190 | 1/1965 | Thune | 210/242 |
| 3,656,619 | 4/1972 | Ryan et al. | 210/242 |
| 3,237,774 | 3/1966 | Schuback | 210/242 |
| 3,630,376 | 12/1971 | Price | 210/DIG. 21 |

FOREIGN PATENTS OR APPLICATIONS 931,594   7/1963   Great Britain.................210/DIG. 21

OTHER PUBLICATIONS

Ocean Industry, June, 1970, p. 48 et al., Gulf Publishing Co., Houston, Texas.

Primary Examiner—Samih N. Zaharna
Assistant Examiner—T. A. Granger
Attorney—Cushman, Darby & Cushman

[57] ABSTRACT

The present invention relates to an improved vessel for removing oil from water surfaces, said vessel comprising means for carrying out both a mechanical and a chemical removal of the oil. Thus, in the first part of the vessel there are means for taking in water and oil and for the separation thereof by a skimming device. In the rear part of the vessel which part communicates with said first part over an adjustable overflow means, are arranged means for spraying chemicals onto the overflow from said first part. An outlet wherein a propulsion means for the vessel is placed, is located in the rear part thereof.

8 Claims, 2 Drawing Figures

VESSEL FOR THE REMOVAL OF OIL ON WATER

The present invention concerns a vessel for the removal of oil which has accumulated on the water surface.

There are previously known various devices for the undertaking of such removal of oil, and from Norwegian Pat. No. 101.887 is known a vessel where oil and water are taken in forward over a skimming board, the leading edge of which lies below the surface of the water and the rear edge of which reaches up above the the water. The water and oil separate within the vessel in that the water escapes through openings in the bottom of the vessel and the oil is removed by means of a pump. To improve the intake of the oil and water mixture in such oil removing vessels, it is also previously known to utilize paddle wheels on the forward end of the vessel. Oil and water may furthermore be taken up by means of a continually running belt which extends down into the water at the forward end of the vessel.

There is from Norwegian Pat. No. 116.364 further known a vessel for the removal of oil from the surface of the water, by which oil and water, by means of a weir plate, are led into an opening in the sides of the vessel in such a way that a vortex is formed at the inlet. Oil and water separate inside the vessel, in the separation tank of same, and the oil layer or the water layer is removed by pumping to a suitable place.

It is further known to remove oil from water by means of chemicals which are sprayed on the oil, and which emulsifies the oil in the water. Further, solid matters may be utilized, such as, i.e., shredded peat, which absorbs oil and either sinks to the bottom or floats on the water and then must be removed later.

The previously known and above mentioned vessels have relatively low capacity and the effectiveness, that is, the ability to complete removal of the oil, is often not adequate, especially in the cases where the oil film on the water surface is very thin. When using chemicals to emulsify the oil, there are, as a rule, used purely arbitrary dosages of said chemicals. The amount used will in most cases be much too large, this being caused by an intent to ensure a complete emulsification. This results in an accumulation of chemicals in the water which may be deleterious to life in the sea. Means for the adsorption of oil, will, as mentioned, either sink to the bottom together with the oil and therefore be deleterious to the life there; or float on the water, such that it is necessary to carry out an additional removing operation.

The present invention intends to provide a device which does not cause the above mentioned drawbacks, and which represents an improvement over the previously known vessels. The invention represents an altogether special construction which combines mechanical removal of oil with removal by means of agents which emulsify the oil or remove it by other methods. This construction ensures an essentially complete and rapid removal of the oil without the use of an unnecessary excess of oil removal agents.

According to the present invention there is accordingly provided a vessel for the removal of oil on water, and this vessel is characterized in that it, for combined mechanical and chemical removal of the oil, comprises an intake arranged at the forward edge, which connects with a separation tank, in the rear part of which is placed a skimming device for oil, which reaches across the tank, crosswisely, preferably in the shape of a dish, a vertically placed and across the tank ranging separating wall behind the skimming device, where it, between the separating wall and the bottom of the tank is provided a passage which leads to the rear edge of the separation tank, this being formed by a vertically adjustable weir; a behind the separation tank arranged suction chamber comprising a dosaging device for an oil removing agent, preferably an emulsifier, wherein, in the lower rear part is an outlet in which the propulsion device of the vessel is located.

On each side of the intake, and extending in the normal direction of movement of the vessel, there are preferably, fastened sweeping arms which float on the water and which shall direct the surface layer towards the intake in the vessel. The size of this intake may be adjusted by that the lower edge of same is formed by the top edge of a vertically adjustable weir wall. This upper edge may in this way be set at a fixed depth below the surface of the water, and follows this automatically and preferably by means of floats. The incoming amount of the oil and water mixture is adjusted with reference to the desired speed of the vessel and the amount of oil present on the water. In order that the skimming device shall be able to catch the oil which collects on the surface of the water in the separation tank, the skimming device is made adjustable in the vertical direction such that it may be adjusted in relation to the level of liquid in said tank. It is further preferred that the skimming device is connected to a storage tank, into which the oil may be pumped. Between the storage tank and the skimming device may advantageously be inserted a container, being placed so that oil from the skimming device may flow freely down into the said container, and the oil may then be pumped from the container into the storage tank. In this way, one avoids pumping the oil directly from the skimming device, which, because of the relatively small amounts of oil present in the skimming device at any time, may cause the pump system to draw air into the pumping system. By utilizing said container, a suitable oil sump may be maintained which may be pumped into the storage tank at intervals.

The dosaging device for the oil removing agent is preferably located such that the discharging orifice or orifices are located in the upper part of the suction chamber. In this way the oil removing agent may be sprayed or sprinkled down on the liquid which is in the chamber.

As mentioned, the propulsion device of the vessel, i.e., a propeller, is located in the outlet opening of the suction chamber, and will therefore be dependent upon the amount of water which is discharged from the outlet to provide for the propulsion of the vessel. If this amount of water is not sufficient there is, according to the invention, provided an opening in the suction chamber bottom, and said opening may be closed by a pivoted cover, such that additional water for the propulsion of the vessel may be provided from the outside of the vessel by opening the cover. In order that a sufficient amount of discharge water should be available at all times, the weight of the cover is suitably so adjusted that the cover opens automatically when the level of liquid in the suction chamber is approximately 10 cm lower than that outside the vessel.

Figure 2:
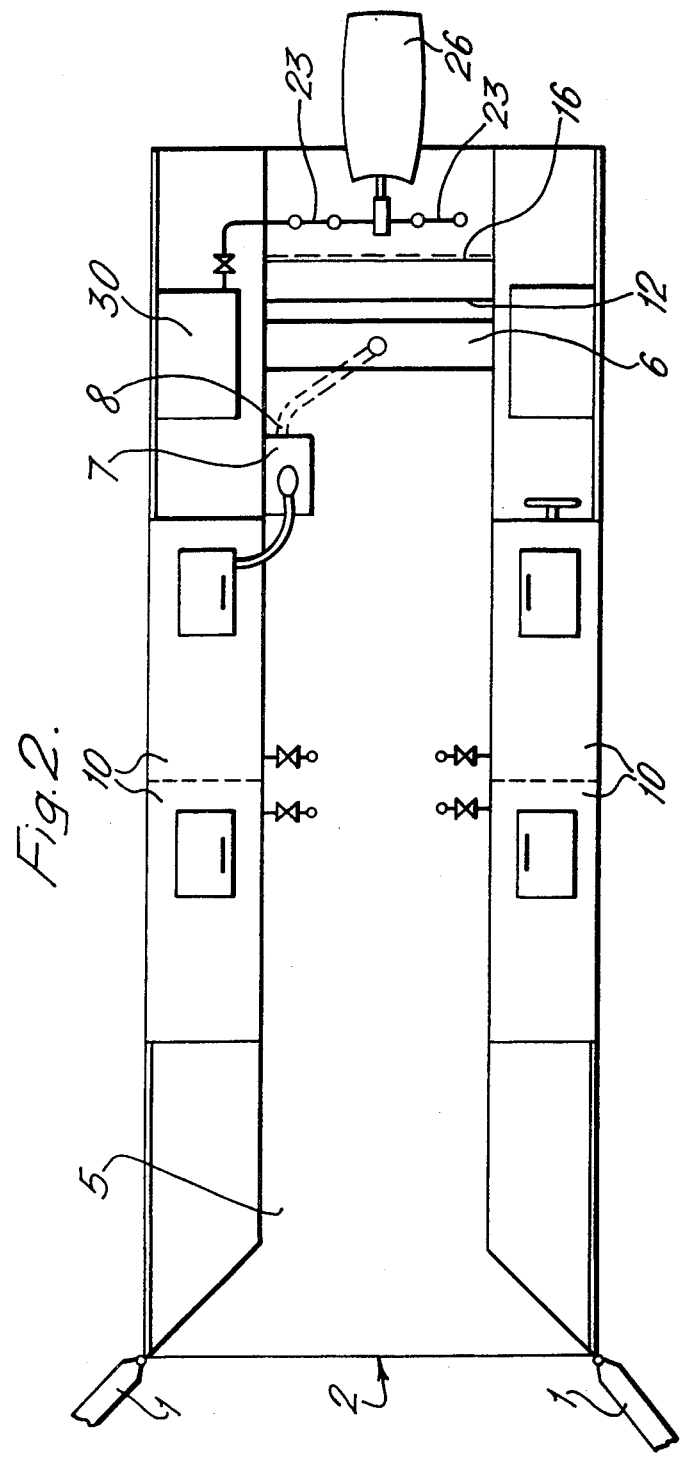

The invention shall in the following be explained with reference to the drawings, where FIG. 1 shows a longitudinal section through the vessel, and FIG. 2 shows a plan of the vessel.

On the drawings, there are, on the forward part of the vessel shown a sweeping arm 1 and an intake 2. One sweeping arm is located on each side of the intake, and said sweeping arms extend in the direction of the normal movement of the vessel, and float on the water surface and spread outwards in relation to the longitudinal axis of the vessel. The upper edge of the weir wall 3 is set at a definite depth under the surface of the water such that the oil covered water may flow freely into the separation tank 5. The upper edge of the weir wall 3 may suitably be formed as an overflow (sill) which follows the water surface automatically by means of floats (not shown). Further, vertical damping baffles may advantageously be provided in the separation tank which serve to prevent sloshing and turbulence in the incoming oil and water mixture, such that the oil will more easily and more rapidly form a separate layer on the surface of the water in the tank. The skimming device 6, which extends entirely across the separation tank, is located in the aft part of the tank and is partially submerged in the liquid. The skimming dish 6 is connected to an oil container 7 by way of a hose 8. The oil which little by little accumulates in the container may be removed to storage tanks 10 by means of a pumping arrangement 9. In said storage tanks, which are equipped with drain cocks 11, a further separation of oil from water, which eventually has been included during the skimming in the dish 6, may take place. A vertical separating wall 12, extending across the separation tank 5 and above the liquid level 4, is located immediately behind the skimming dish 6. Between the bottom 13 of the separation tank and the separation wall 12, an opening 14 leads to the rear of the separation tank 15. Contiguously with the upper part of said rear end, an overflow weir 16 is arranged, which is adjustable in the vertical direction. Said vertical adjustment of both the weir 16 and the skimming dish 6 is indicated by means of the line pull 17, 18, which passes over the rollers 19, 20. Aft of the separation tank 5, the vessel is constructed to form a suction chamber 21, where, above the liquid level 22 there is provided a dosaging device 23 for chemical oil removing agents. Said dosaging device may, if desired, be equipped with several discharge orifices, evenly distributed across the suction chamber. In the discharge opening 24 of the suction chamber, the propellers 25 of the propulsion device 26 of the vessel are located. A shield 27 is provided such that the propeller stream may be deflected 90° or approximately 180°, when it is desired that the vessel should lie still or reverse, respectively. In the bottom of the suction chamber 21 is an opening 28 which may be covered by a pivoted cover 29 which may be opened when additional propulsion water is required.

In FIG. 2 the vessel is shaped as a barge-like craft, self propelled 26. The storage tanks 10 are located along the sides of the vessel and may be interconnected for the transfer of oil. The separation tank 5 is located along the middle of the vessel. On the port side, aft, is located a container 30 for a chemical oil removing agent which supplies the dosaging device 23.

The functions of the vessel shall in the following be explained with reference to the drawings. Oil and water, being gathered by the sweeping arms 1, flow into the separation tank 5 over the weir wall 3. This flow is brought about in that water is continually removed from the rear edge of the separation tank. Within the separation tank, the water is withheld long enough so that the oil separates and accumulates on the surface. The continual flow towards the rear of the tank causes the oil to collect in the rear of the tank where the skimming dish 6 is located. The oil and some water are collected by said dish and flow via the line 8 to the sump or container 7, from where the content is pumped to one of the storage tanks 10. In these tanks the storage time is longer than in the separation tank 5, and water separates and is drained back to the separation tank. When the storage tanks are filled, the contents must be emptied on to land or to another vessel. The storage tank may also serve as ballasting tanks for the trimming of the vessel.

The water which is taken into the separation tank is drawn down towards the bottom in the rear of said tank, and passes through the opening 14 under the partition wall 12. The water then flows over the adjustable weir 16 down into the suction chamber 21 where the level of the liquid is lower than that of the separation tank. The flow through the separation tank is controlled by regulating the height of the weir 16. The mechanically cleaned water flowing into the chamber 21 will always contain some oil, and is therefore treated with chemical emulsifying means through the dosaging device 23. The remains of oil present in the outlet water are in this way completely emulsified by the violent agitation of water, oil, and emulsifier, in that the agitation is provided by the propulsion device. It is in this way possible to quite accurately determine the amount of the emulsifier which is necessary to emulsify the remaining oil. The propulsion means may be an outboard motor (as shown on the drawings) for smaller units, and inboard motors with a waterjet aggregate, or internal propellers, for the larger units.

Under particular circumstances the oil may be so emulsified in the sea water that separation by means of buoyancy is difficult except by very long retention times in the separation tank 5. The vessel may then be employed to continue the emulsification process, in that the oil-water mixture is taken into the vessel, passed through the tank 5 without separation of oil, the mixture then flowing to the chamber 21 where emulsifier is added, which is agitated together with the said mixture by means of the propulsion aggregate. The treated water is finally discharged through the outlet 24. As stated, additional propulsion water may be let in through the opening 28 when the liquid level 22 reaches a certain level in relation to the level outside the vessel.

By use of the vessel according to the invention, essential savings in chemicals may be obtained in relation to the usual method consisting of spraying the emulsifier on the water and then running a boat over the sprayed area to agitate with the propeller.

It must be understood that the present vessel (shown) may be so equipped that it also may be used for the laying out of floating oil booms. Further, it is obvious that the propulsion machinery, which in the version shown is an outboard motor, also may be a water jet aggregate.

Having described our invention, we claim:

1. A vessel for the removal of oil on water by combined mechanical and chemical means, said vessel comprising an intake portion at the forward part of said vessel, a separation tank connected to said intake portion, said separation tank having a rear end and a skimming device for oil disposed adjacent said rear end and extending across said tank, said skimming device being in the form of a dish, a vertically extending partition wall extending across said tank and being disposed between said rear end and said skimming device, said partition wall having a portion spaced from the bottom of said tank to define a passage leading to the rear edge of said separation tank, said rear edge of said separation tank having a vertically adjustable weir, a suction chamber being provided beyond said rear edge of said separation tank, said suction chamber including a dosaging device for supplying an oil removing agent, said suction chamber having an outlet leading to a propulsion device provided for moving said vessel.

2. A vessel as claimed in claim 1 wherein said intake portion is provided with a vertically adjustable weir wall having an upper edge whereby the size of the intake may be adjusted by setting said upper edge of said weir wall at a selected depth under the water surface.

3. Vessel according to claim 1, characterized in that it is provided with sweeping arms, which extend horizontally in the normal direction of movement of the vessel and are fastened one on each side of said intake portion.

4. Vessel according to claim 1, characterized in that said skimming device is adjustable in the vertical direction.

5. Vessel according to claim 1, characterized in that said skimming device is connected to an oil storage tank through a pumping device.

6. Vessel according to claim 5, characterized in that between said oil storage tank and the skimming device there is inserted a container which is located so that oil from the skimming device may flow freely down into said container, and so that oil from the container may be lifted to the storage tank by means of said pumping device.

7. Vessel according to claim 1, characterized in that the dosaging device has a discharge orifice located in the upper part of the suction chamber.

8. Vessel according to claim 1, characterized in that the bottom of the suction chamber has an opening which may be closed by a pivoted cover, said opening being adapted to the passage of additional propulsion water.

* * * * *